(12) United States Patent
Okada

(10) Patent No.: US 12,151,698 B2
(45) Date of Patent: Nov. 26, 2024

(54) NOTIFICATION CONTROL DEVICE FOR VEHICLE AND NOTIFICATION CONTROL METHOD FOR VEHICLE

(71) Applicant: DENSO CORPORATION, Kariya (JP)

(72) Inventor: Masaya Okada, Nisshin (JP)

(73) Assignee: DENSO CORPORATION, Kariya (JP)

( * ) Notice: Subject to any disclaimer, the term of this patent is extended or adjusted under 35 U.S.C. 154(b) by 352 days.

(21) Appl. No.: 17/647,933

(22) Filed: Jan. 13, 2022

(65) Prior Publication Data
US 2022/0135065 A1   May 5, 2022

Related U.S. Application Data

(63) Continuation of application No. PCT/JP2020/026440, filed on Jul. 6, 2020.

(30) Foreign Application Priority Data

Jul. 16, 2019 (JP) ................................. 2019-131255

(51) Int. Cl.
| | |
|---|---|
| *B60W 40/08* | (2012.01) |
| *B60W 40/10* | (2012.01) |
| *B60W 50/14* | (2020.01) |
| *B60W 60/00* | (2020.01) |

(52) U.S. Cl.
CPC ............ *B60W 50/14* (2013.01); *B60W 40/08* (2013.01); *B60W 40/10* (2013.01); *B60W 60/001* (2020.02); *B60W 2540/229* (2020.02)

(58) Field of Classification Search
CPC .......... B60W 2540/229; B60W 30/16; B60W 40/08; B60W 40/10; B60W 50/14; B60W 60/001

See application file for complete search history.

(56) References Cited

U.S. PATENT DOCUMENTS

| | | | |
|---|---|---|---|
| 2015/0092056 A1* | 4/2015 | Rau ..................... | G08B 21/06 |
| | | | 348/148 |
| 2016/0221585 A1 | 8/2016 | Ichioka et al. | |
| 2016/0332569 A1* | 11/2016 | Ishida ................... | B60Q 9/008 |
| 2016/0362113 A1* | 12/2016 | Takaso ................. | B60W 10/20 |

(Continued)

FOREIGN PATENT DOCUMENTS

| | | |
|---|---|---|
| JP | H10-166895 A | 6/1998 |
| JP | 2018-083552 A | 5/2018 |

*Primary Examiner* — Matthew J. Reda
(74) *Attorney, Agent, or Firm* — MASCHOFF BRENNAN

(57) ABSTRACT

A notification control device includes an occupant state identifying unit, a behavior change obtaining unit, and a notification processing unit. The occupant state identifying unit is configured to identify a state of an occupant of the vehicle among a plurality of states. The behavior change obtaining unit is configured to obtain an imminent behavior change of the vehicle during the automated driving. The notification processing unit is configured to cause a notification device to notify the occupant of the imminent behavior change when the imminent behavior change obtained by the behavior change obtaining unit satisfies a notification condition. The notification condition is set for each of the plurality of states. The notification condition for a first distracted state categorized into a distracted group is different from the notification condition for a second distracted state categorized into the distracted group.

12 Claims, 5 Drawing Sheets

(56) References Cited

U.S. PATENT DOCUMENTS

| | | | |
|---|---|---|---|
| 2017/0072850 A1* | 3/2017 | Curtis | B60W 50/0097 |
| 2017/0270798 A1* | 9/2017 | Ushiba | B60W 60/0059 |
| 2018/0319407 A1* | 11/2018 | Lisseman | B60W 10/20 |
| 2019/0056732 A1* | 2/2019 | Aoi | G08B 21/06 |
| 2019/0092346 A1 | 3/2019 | Odate et al. | |
| 2019/0202479 A1* | 7/2019 | Beauvais | B60K 35/28 |
| 2019/0276047 A1* | 9/2019 | Suzuki | G08B 3/10 |
| 2020/0101968 A1* | 4/2020 | Kim | B60W 30/09 |
| 2020/0298876 A1* | 9/2020 | Mimura | B60R 16/02 |

\* cited by examiner

NOTIFICATION CONTROL DEVICE FOR VEHICLE AND NOTIFICATION CONTROL METHOD FOR VEHICLE

CROSS REFERENCE TO RELATED APPLICATION

The present application is a continuation application of International Patent Application No. PCT/JP2020/026440 filed on Jul. 6, 2020, which designated the U.S. and claims the benefit of priority from Japanese Patent Application No. 2019-131255 filed on Jul. 16, 2019. The entire disclosures of all of the above applications are incorporated herein by reference.

TECHNICAL FIELD

The present disclosure relates to a notification control device for a vehicle and a notification control method for the vehicle.

BACKGROUND

In a general technique, a behavior change of a vehicle during an automated driving is not notified when the behavior change is the same level as the behavior change corresponding to the characteristics of the occupant and is as expected by the occupant, and the behavior change is notified when the behavior change is not the same level as the behavior change corresponding to the characteristics of the occupant. According to this technique, the behavior change of the vehicle is notified when the occupant is looking aside or sleeping even if the behavior change corresponding to the characteristics of the occupant is the same level as the behavior change of the vehicle due to the automated driving. That is, the condition for notifying the occupant of the behavior change of the vehicle is loosen when the occupant is looking aside or sleeping.

SUMMARY

According to a first aspect of the present disclosure, a notification control device for a vehicle configured to perform an automated driving includes an occupant state identifying unit, a behavior change obtaining unit, and a notification processing unit. The occupant state identifying unit is configured to identify a state of an occupant of the vehicle among a plurality of states, the plurality of states being divided into a distracted group and a non-distracted group. The behavior change obtaining unit is configured to obtain an imminent behavior change of the vehicle during the automated driving. The notification processing unit is configured to cause a notification device to notify the occupant of the imminent behavior change when the imminent behavior change obtained by the behavior change obtaining unit satisfies a notification condition. The plurality of states include a plurality of distracted states categorized into the distracted group. Each of the plurality of distracted states is a state of the occupant who is not focusing on traveling of the vehicle. The plurality of distracted states include a first distracted state and a second distracted state. The notification condition is set for each of the plurality of states. The notification condition for the first distracted state is different from the notification condition for the second distracted state.

According to a second aspect of the present disclosure, a method of controlling a notification for a vehicle configured to perform an automated driving includes: identifying a state of an occupant of the vehicle among a plurality of states, the plurality of states being divided into a distracted group and a non-distracted group; obtaining an imminent behavior change of the vehicle during the automated driving; and causing a notification device to notify the occupant of the imminent behavior change when the obtained imminent behavior change satisfies a notification condition. The plurality of states include a plurality of distracted states categorized into the distracted group. Each of the plurality of distracted states is a state of the occupant who is not focusing on traveling of the vehicle. The plurality of distracted states include a first distracted state and a second distracted state. The notification condition is set for each of the plurality of states. The notification condition for the first distracted state is different from the notification condition for the second distracted state.

According to a third aspect of the present disclosure, a notification control device for a vehicle configured to perform an automated driving includes at least one processor and at least one memory, the at least one memory storing computer-readable instructions. The computer readable instructions are configured to, when executed by the at least one processor, cause the at least one processor to: identify a state of an occupant of the vehicle among a plurality of states, the plurality of states being divided into a distracted group and a non-distracted group; obtain an imminent behavior change of the vehicle during the automated driving; and cause a notification device to notify the occupant of the imminent behavior change when the obtained imminent behavior change satisfies a notification condition. The plurality of states include a plurality of distracted states categorized into the distracted group. Each of the plurality of distracted states is a state of the occupant who is not focusing on traveling of the vehicle. The plurality of distracted states include a first distracted state and a second distracted state. The notification condition is set for each of the plurality of states. The notification condition for the first distracted state is different from the notification condition for the second distracted state.

EMBODIMENTS

Figure 1:
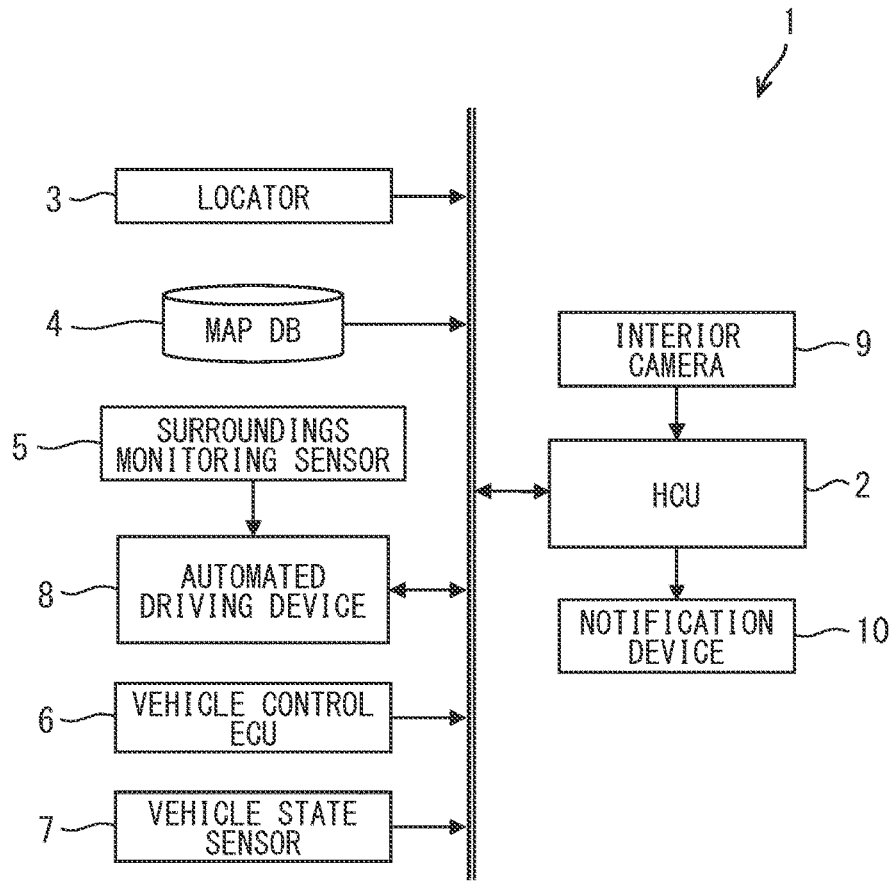
FIG. 1 is a diagram showing an example of a schematic configuration of a vehicle system.

According to a comparative example of the present disclosure, the condition for notifying the occupant of the behavior change of the vehicle is uniformly loosen when the occupant is looking aside or sleeping. However, even when the state of the occupant is categorized into a group of states where the occupant is not focusing on the traveling of the vehicle, the notification of the behavior change of the vehicle may be unnecessary depending on the state. For example, when the occupant is in a state that is not susceptive to an influence of the behavior change of the vehicle, the notification of the behavior change of the vehicle may be unnecessary for the occupant even if the state of the occupant is categorized into the group of states where the occupant is not focusing on the traveling of the vehicle. That is, the technique of the comparative example may increase the notifications unnecessary for the occupant.

Multiple embodiments will be described with reference to the drawings. For convenience of description, the same reference symbols are assigned to portions having the same functions as those illustrated in the drawings used in the description so far among the plurality of embodiments, and a description of the same portions may be omitted. Description in another applicable embodiment may be referred to for such a portion denoted by the identical reference symbols.

First Embodiment

Schematic Configuration of Vehicle System 1

Hereinafter, Embodiment 1 of the present disclosure will be described with reference to drawings. A vehicle system 1 shown in FIG. 1 is used for a vehicle configured to perform automated driving, and includes an HCU (Human Machine Interface Control Unit) 2, a locator 3, a map database (hereinafter, referred to as a map DB) 4, a surroundings monitoring sensor 5, a vehicle control ECU 6, a vehicle state sensor 7, an automated driving device 8, an interior camera 9, and a notification device 10. The HCU 2, the locator 3, the map DB 4, the vehicle control ECU 6, the vehicle state sensor 7, and the automated driving device 8 are connected with the in-vehicle LAN, for example. Hereinafter, a vehicle using the vehicle system 1 is referred to as a subject vehicle.

The subject vehicle is configured to perform the automated driving. The degree of the automated driving (hereinafter, referred to as an automation level) includes multiple levels as defined by SAE, for example. According to the SAE definition, for example, the automation levels are categorized into the following six levels.

Level 0 is the level where the driver performs all driving tasks without any intervention of the system. The driving tasks include, for example, a steering control, an acceleration, and a deceleration. The level 0 corresponds to so-called manual driving. Level 1 is the level where the system assists the steering control or the acceleration and deceleration. Level 2 is the level where the system assists the steering control, the acceleration and deceleration. The levels 1, 2 correspond to so-called driving assistance.

Level 3 is the level where the system performs all driving tasks in certain locations, such as highways, and the driver drives the vehicle in an emergency. In the level 3, the driver must be able to respond quickly when the system requests a driver change. The level 3 corresponds to so-called conditional automated driving. Level 4 is the level at which the system is capable of performing all driving tasks, except under specific circumstances such as unsupported roads, extreme environments, etc. The level 4 corresponds to so-called highly automated driving. Level 5 is the level at which the system is capable of performing all driving tasks in any situation. The level 5 corresponds to so-called fully automated driving. The levels 3-5 correspond to so-called automated driving.

The subject vehicle may have the automation level of level 3 or higher level. The automation level may be switchable. For example, the subject vehicle may be configured to switch the automation levels between the level 3 or automated driving at higher level and the manual driving at level 0. Hereinafter, an example where the subject vehicle is driving at the level 3 or higher level will be described.

The locator 3 includes a GNSS (Global Navigation Satellite System) receiver and an inertial sensor. The GNSS receiver is configured to receive positioning signals from multiple positioning satellites. The inertial sensor includes a gyro sensor and an acceleration sensor, for example. The locator 3 combines the positioning signals received by the GNSS receiver with the measurement results of the inertial sensor to sequentially detect the position of the subject vehicle (hereinafter, subject vehicle position) on which the locator 4 is mounted. The subject vehicle position may be represented by, for example, coordinates of latitude and longitude. The subject vehicle position may be measured using a travel distance obtained from signals sequentially output from a vehicle speed sensor mounted on the subject vehicle.

The map DB 4 is a nonvolatile memory and stores map data such as link data, node data, road shapes, buildings and the like. The map data may include a three-dimensional map including feature points of road shapes and buildings. When the three-dimensional map including the feature points of the road shapes and buildings is used as the map data, the locator 3 may be configured to identify the subject vehicle position using the detection results of a LIDAR (Light Detection and Ranging/Laser Imaging Detection and Ranging) configured to detect the feature points of the road shapes and the buildings or the surroundings monitoring sensor 5 such as an exterior camera. The three-dimensional map may be generated by REM (Road Experience Management) based on captured images.

The surroundings monitoring sensor 5 is an autonomous sensor configured to monitor the surroundings of the subject vehicle. As one example, the surroundings monitoring sensor 5 is used for recognizing moving objects such as pedestrians, animals other than human, and vehicles other than the subject vehicle, and static objects such as guardrails, curbs, and trees. In addition, the surroundings monitoring sensor 5 is used for recognizing road markings such as traffic lane markings around the subject vehicle. For example, the surroundings monitoring sensor 5 is a surroundings monitoring camera that captures a predetermined range around the subject vehicle, or a distance sensor that transmits a scanning wave to the predetermined range around the subject vehicle such as a millimeter wave radar, a sonar, or a lidar.

The vehicle control ECU 6 is an electronic control device configured to perform the traveling control of the subject vehicle. The traveling control includes acceleration/deceleration control and/or steering control. The vehicle control ECU 6 includes a steering ECU that performs steering control, a power unit control ECU and a brake ECU that perform acceleration/deceleration control, and the like. The vehicle control ECU 6 is configured to perform the traveling control by outputting control signals to traveling control devices such as an electronic throttle, a brake actuator, and an EPS (Electric Power Steering) motor.

The vehicle state sensor 7 is a sensor group for detecting various states of the vehicle. The vehicle state sensor 7 includes a vehicle speed sensor, a steering sensor, an acceleration sensor, a yaw rate sensor, and the like. The vehicle speed sensor is configured to detect the speed of the subject vehicle. The steering sensor is configured to detect the steering angle of the subject vehicle. The acceleration sensor is configured to detect the acceleration in a front-rear direction of the subject vehicle, the acceleration in a left-right direction, and the like. The acceleration sensor is configured to detect the deceleration that is a negative acceleration. The yaw rate sensor is configured to detect the angular velocity of the subject vehicle.

The automated driving device 8 includes, for example, a processor, a memory, an I/O, and a bus that connects those devices, and executes various processes related to the automated driving by executing a control program stored in the memory. The memory referred to here is a non-transitory tangible storage medium for storing programs and data that can be read by a computer non-transitory way. The non-transitory tangible storage medium is embodied by a semiconductor memory or a magnetic disk.

The automated driving device 8 is configured to perform a traveling environment recognition process to recognize a traveling environment of the subject vehicle based on the subject vehicle position acquired from the locator 3, the map data acquired from the map DB 4, the sensing information acquired from the surroundings monitoring sensor 5, and the like. For example, in the traveling environment recognition process, the positions, shapes, and moving states of objects around the subject vehicle are recognized, and a virtual space in which the actual traveling environment is reproduced is created. In the traveling environment recognition process, the distances between the subject vehicle and surrounding vehicles, and the relative speed of the surrounding vehicles are recognized as the traveling environment from the sensing information acquired from the surroundings monitoring sensor 5. In the traveling environment recognition process, the lighting status of the direction indicator lights of the surrounding vehicles are recognized. When the location information and the speed information of the surrounding vehicles and the like can be acquired through the communication module, the traveling environment may be recognized based on these information.

The automated driving device 8 is configured to perform the process related to the substitution of the driving operations by the driver, using the traveling environment recognized in the traveling environment recognition process and the state of the subject vehicle detected by the vehicle state sensor 7. That is, the automated driving device 8 is configured to perform the automated driving. The automated driving device 8 uses the traveling environment recognized in the traveling environment recognition process, and generates the traveling schedule to drive the subject vehicle with the automated driving. For example, a route search process is performed to generate a recommended route, as a medium-term to long-term traveling schedule, from the subject vehicle position to the destination. In a short-term traveling schedule for performing the travel along the medium-term and long-term traveling schedule, execution of steering for changing the lane, acceleration and deceleration for adjusting the speed, steering, braking, and the like for avoiding obstacles are determined. That is, imminent behavior changes are determined. The generation of the traveling schedule may be performed using the machine learning, for example.

The automated driving device 8 is configured to evaluate the safety level of the generated traveling schedule. For example, the automated driving device 8 is configured to evaluate the safety level of the traveling schedule using a mathematical model that formulates the concept of the safety driving for facilitating the evaluation of the safety level of the traveling schedule. For example, RSS (Responsibility Sensitive Safety) model may be used as the mathematical model. The automated driving device 8 is configured to evaluate the safety level based on whether the distance between the subject vehicle and the surrounding obstacle is equal to or greater than a reference distance (hereinafter, referred to as a safety distance) that is calculated using the mathematical model. The distance between the subject vehicle and the surrounding obstacle may be the distance in the front-rear direction of the subject vehicle or the distance in the left-right direction of the subject vehicle. The surrounding obstacles include, for example, surrounding vehicles around the subject vehicle, pedestrians, stationary objects such as objects on the roads.

The automated driving device 8 is configured to determine that the generated traveling schedule is safe when the distance between the subject vehicle and the surrounding obstacle is kept at or above the safety distance. In contrast, the automated driving device 8 is configured to determine that the generated traveling schedule is not safe when the distance between the subject vehicle and the surrounding obstacle is less than the safety distance. The automated driving device 8 is configured to use, for the automated driving, the traveling schedule that is evaluated as safe. In contrast, when the traveling schedule is evaluated as not safe, the automated driving device 8 modifies the traveling schedule to another traveling schedule that is to be evaluated as safe to use the automated driving.

The automated driving device 8 is configured to cause the vehicle control ECU 6 to automatically control the acceleration/deceleration and/or steering of the subject vehicle in accordance with the traveling schedule evaluated as safe, and thereby the automated driving that substitutes the driving operation by the driver is performed.

The interior camera 9 is configured to capture an image of a predetermined range in the passenger compartment of the subject vehicle. As the interior camera 9, a DSM (Driver Status Monitor) for monitoring the driver of the vehicle may be used. The DSM is composed of a near infrared light source, a near infrared camera, and a control unit for controlling these devices. The interior camera 9 may be configured to capture only the driver of the subject vehicle, or occupants including the driver and the other. The image of the passenger compartment captured by the interior camera 9 is output to the HCU 2.

The notification device 10 is configured to give a notification to the occupants of the subject vehicle according to the instructions of the HCU 2. The notification device 10 is a display device such as an indicator, a display and the like configured to perform the notification by displaying information. The notification device 10 may be an audio output device such as a speaker configured to perform the notification by audio information. The notification device 10 may be a vibrator configured to perform the notification by vibration. The vibrator is disposed at a position in the subject vehicle that comes into contact with the occupant. For example, the vibrator may be disposed on a seat of the subject vehicle or a steering wheel. When the vibrator is used as the notification device 10, and the occupants other than the driver are also the notification target, the vibrator may be disposed on each seat.

The HCU 2 is mainly composed of a microcomputer including a processor, a memory, an I/O, and a bus connecting them together. The HCU 2 is configured to perform various process (hereinafter, referred to as a behavior notification process) for notifying the behavior change of the subject vehicle during the automated driving by executing the control program stored in the memory. The execution of the control program by the processor corresponds to the execution of a vehicular notification control method corresponding to the control program. The memory mentioned in the above is a non-transitory tangible storage medium that stores non-transitorily computer-readable programs and data. The non-transitory tangible storage medium is embodied by a semiconductor memory or a magnetic disk. The HCU 2 corresponds to a vehicular notification control device. The details of the HCU 2 will be described below.

Schematic Configuration of HCU 2

Figure 2:
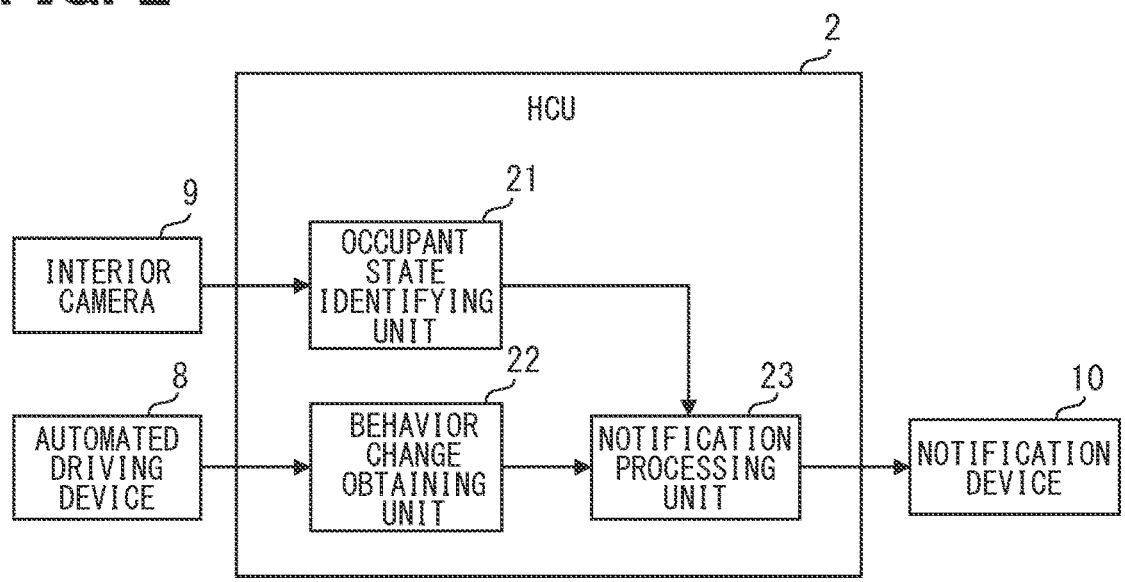
FIG. 2 is a diagram showing an example of a configuration of HCU.

The following will describe a schematic configuration of the HCU 2 with reference to FIG. 2. As shown in FIG. 2, the HCU 2 includes, as functional blocks, an occupant state identifying unit 21, a behavior change obtaining unit 22, and a notification processing unit 23. Some or all of the functions executed by the HCU 2 may be configured by hardware using one or more ICs or the like. Alternatively, some or all of the functions executed by the HCU 2 may be implemented by a combination of hardware manner and software manner which adopts a processor to execute the functions.

The occupant state identifying unit 21 is configured to sequentially acquire the image of the passenger compartment taken by the interior camera 51. The occupant state identifying unit 21 is configured to identify a state of the occupant of the subject vehicle among multiple states based on the captured image of the passenger compartment. The occupant state identifying unit 21 is configured to identify the state of the occupant of the subject vehicle among multiple states by extracting, from the image of the passenger compartment, feature values identifying the state of the occupant using the image recognition technology. For example, the occupant state identifying unit 21 is configured to identify the state of the occupant of the subject vehicle among multiple states using the pattern recognition, the machine learning, or the like.

The states of the occupant are roughly categorized into a non-distracted group including states where the occupant focuses on the traveling of the vehicle (hereinafter, referred to as driving concentration states or non-distracted states) and a distracted group including states where the occupant does not focus on the traveling of the vehicle (hereinafter, referred to as non-driving concentration states or distracted states). The driving concentration states include a state where the occupant is gazing at the front of the subject vehicle, for example. The state where the occupant is gazing at the front of the subject vehicle may be identified by determining whether the length of the time in which the occupant is not gazing at the front of the vehicle is less than the reference time length set for distinguishing gazing from not gazing. The non-driving concentration states are states that do not correspond to the driving concentration state. Examples of the non-driving concentration states will be described below.

It may be preferable that the occupant state identifying unit 21 be configured to identify, as the non-driving concentration states, at least a state where the occupant is holding an object and a state where the occupant is not holding an object. That is, the distracted group includes a holding subgroup including states where the occupant is holding an object and a non-holding subgroup including states where the occupant is not holding an object. This is because the magnitude of influence due to the behavior change of the subject vehicle differs depending on whether the occupant is holding an object or not even when the occupant is in a state categorized into the distracted group. When the occupant is holding an object, the object is more likely to move due to the behavior change of the subject vehicle compared to the body of the seated occupant since the object is supported by the hand. Accordingly, the influence of the behavior change of the subject vehicle may be greater in the state where the occupant is holding an object than in the state where the occupant is not holding an object.

In the non-driving concentration states, the states where the occupant is not holding an object includes a state where the occupant is talking, the state where the occupant is looking aside, the state where the occupant is feeling sleepy, and the like. The occupant state identifying unit 21 may be configured to identify the state where the occupant is talking based on, for example, the number of times the occupant opens his/her mouth in a predetermined time period being above a certain level. The occupant state identifying unit 21 may be configured to identify the state where the occupant is looking aside based on, for example, a continuous time period in which the occupant is not looking at the front of the subject vehicle being equal to or longer than a reference time period. The occupant state identifying unit 21 may be configured to identify the state where the occupant is feeling sleepy based on, for example, the degree of opening of the occupant's eyes.

It may be preferable that the occupant state identifying unit 21 be configured to identify, as the non-driving concentration states, at least a state where the occupant is holding a liquid object and a state where the occupant is holding a solid object. That is, the distracted group may include a liquid-holding subgroup including a state where the occupant is holding a liquid object and a solid-holding subgroup including a state where the occupant is holding a solid object. This is because the magnitude of influence due to the behavior change of the subject vehicle differs depending on whether the occupant is holding a liquid object or a solid object even when the occupant is in a state categorized into the distracted group. Since liquids are likely to move much more than solids due to the behavior change of the subject vehicle, the influence of the behavior change of the subject vehicle in the state where the occupant is holding a liquid object may be greater than in the state where the occupant is holding a solid object. The state where the occupant is holding a liquid object is a state where the occupant is holding a container containing a liquid. The states where the occupant is holding an object are divided into the states where the occupant is holding a liquid object and the states where the occupant is holding a solid object. That is, the holding subgroup may include the liquid-holding subgroup and the sold-holding subgroup.

In the non-driving concentration states, the states where the occupant is holding a liquid object include, for example, a state where the occupant is holding a drink in his/her hand. The occupant state identifying unit 21 may be configured to identify the state where the occupant is holding a drink based on, for example, a shape, a mark or the like characteristic of the container of the drink.

In the non-driving concentration states, the states where the occupant is holding a sold object include, for example, a state where the occupant is holding a mobile terminal such as a smartphone, a laptop PC, and a tablet in his/her hand, a state where the occupant is holding paper medium in his/her hand, and a state where the occupant is holding sold food in his/her hand. The occupant state identifying unit 21 may be configured to identify the state where the occupant is holding a mobile terminal based on, for example, a shape, a mark, or the like characteristic of the mobile terminal. The occupant state identifying unit 21 may be configured to identify the state where the occupant is holding paper medium based on, for example, a shape, a mark, or the like characteristic of the paper medium. The occupant state identifying unit 21 may be configured to identify the state where the occupant is holding solid food based on, for example, a shape, a mark, or the like characteristic of the solid food.

The behavior change obtaining unit 22 is configured to obtain the imminent behavior change of the subject vehicle during the automated driving. The behavior change obtaining unit 22 may be configured to acquire the short-term traveling schedule determined by the automated driving device 8, and obtain the short-term traveling schedule as the imminent behavior change. The behavior change obtaining unit 22 may be configured to obtain, as the imminent behavior change of the subject vehicle, the short-term traveling schedule evaluated as safe by the automated driving device 8. The short-term traveling schedule evaluated as safe by the automated driving device 8 includes the traveling schedule modified to be evaluated as safe by the automated driving device 8. That is, the behavior change obtaining unit 22 may be configured to obtain, as the imminent behavior change of the subject vehicle during the automated driving, the behavior change of the subject vehicle required to keep the distance between the subject vehicle and an obstacle around the subject vehicle at or above the safety distance that is calculated using the predetermined mathematical model and is the criteria for evaluating the safety level. The behavior change obtaining unit 22 may be configured to predict the imminent behavior change of the subject vehicle that is not included in the traveling schedule from the short-term traveling schedule determined by the automated driving device 8.

The behavior change obtained by the behavior change obtaining unit 22 may be the magnitude of the behavior change, for example. The magnitude of the behavior change includes a front-rear acceleration/deceleration that is the acceleration/deceleration in the front-rear direction of the subject vehicle, a left-right acceleration/deceleration that is the acceleration/deceleration in the left-right direction of the subject vehicle, an up-down acceleration/deceleration that is the acceleration/deceleration in the up-down direction of the subject vehicle, the angular velocity of the subject vehicle, and the like. The behavior change obtained by the behavior change obtaining unit 22 may be the difference between the behavior change of the vehicle based on characteristics of the occupant and the behavior change of the vehicle due to the automated driving. In the following example, the behavior change obtained by the behavior change obtaining unit 22 is the magnitude of the behavior change.

Figure 3:
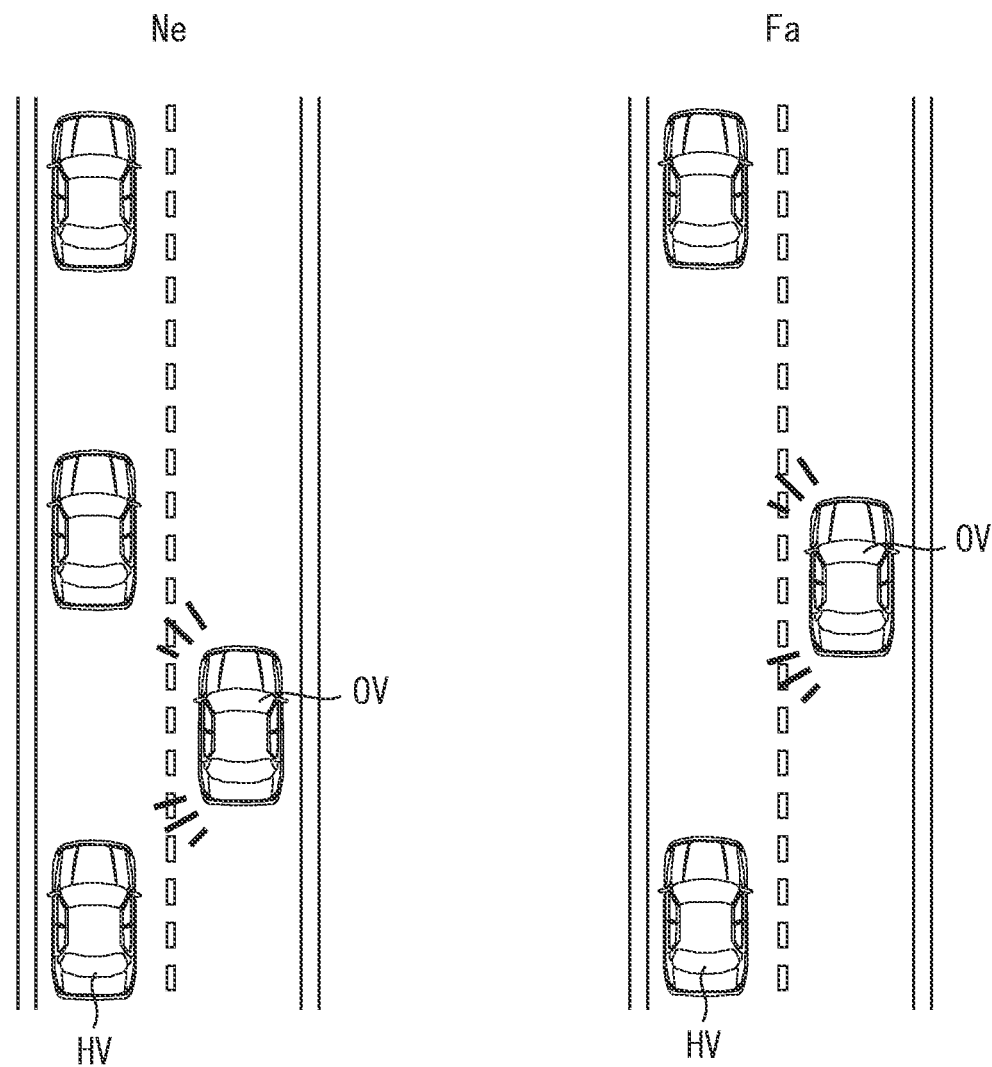
FIG. 3 is a diagram for explaining a magnitude of deceleration in a front-rear direction of the subject vehicle required when it is predicted that a vehicle around a subject vehicle will enter a lane in which the subject vehicle is traveling.

For example, when it is predicted that a surrounding vehicle around the subject vehicle will enter the front of the subject vehicle in the lane in which the subject vehicle is traveling, FIG. 3 is a drawing for explaining the magnitude of the deceleration in the front-rear direction of the subject vehicle required when it is predicted that the surrounding vehicle will enter the front of the subject vehicle in the lane in which the subject vehicle is traveling. "HV" in FIG. 3 indicates the subject vehicle, and "OV" indicates the surrounding vehicle that is about to enter the front of the subject vehicle in the lane in which the subject vehicle is traveling. The distance between the subject vehicle HV and the surrounding vehicle OV is shorter in "Ne" case than in "Fa" case. The smaller the distance between the subject vehicle HV and the surrounding vehicle OV is, the more it is necessary to decelerate in the front-rear direction to keep the safety distance between the subject vehicle HV and the surrounding vehicle OV. Accordingly, when the automated driving device 8 generates the short-term traveling schedule, the deceleration in the front-rear direction is greater in the "Ne" case than in the "Fa" case of FIG. 3. Accordingly, when it is predicted that the surrounding vehicle will enter the front of the subject vehicle in the lane in which the subject vehicle is traveling, the behavior change obtaining unit 22 obtains a greater behavior change in a case where the distance between the subject vehicle and the surrounding vehicle is small.

The behavior change obtaining unit 8 may be configured to predict that the surrounding vehicle will enter the front of the subject vehicle in the lane in which the subject vehicle is traveling by recognizing the traveling environment in which the directional indicator light of the surrounding vehicle on the side of the lane in which the subject vehicle is traveling is flashing.

The greater the curvature of the curve in front of the vehicle is, the more deceleration is required before entering the curve, and the greater the acceleration in the left-right direction while the subject vehicle is traveling on the curve is. Accordingly, when the automated driving device 8 generates the short-term traveling schedule, the deceleration in the front-rear direction is greater in a case where the curvature of the curve in front of the subject vehicle is large. Accordingly, the behavior change obtaining unit 22 obtains a large deceleration in the front-rear direction as the behavior change when the curvature of the curve in front of the subject vehicle is large. Since the acceleration in the left-right direction while the subject vehicle is traveling on the curve is not intentionally generated by the traveling control, the acceleration in the left-right direction is not included in the short-term traveling schedule. Accordingly, the behavior change obtaining unit 22 predictively obtains a large behavior change in the case where the curvature of the curve in front of the subject vehicle is large.

The larger the uneven bump in front of the subject vehicle is, the greater the acceleration in the up-down direction of the subject vehicle when the subject vehicle goes over the bump is. The acceleration in the up-down direction of the subject vehicle when the subject vehicle goes over the bump is not intentionally generated by the traveling control, and the acceleration in the up-down direction is not included in the short-term traveling schedule. Accordingly, the behavior change obtaining unit 22 predictively obtains a large behavior change in the case where the uneven bump in front of the subject vehicle is large. The uneven bump in front of the subject vehicle may be recognized using the result of the traveling environment recognition process by the automated driving device 8. Alternatively, the automated driving device 8 may be configured to obtain the magnitude of the behavior change by estimating the up-down acceleration of the subject vehicle for going over the uneven bump in front of the subject vehicle from the change rate in a direction of pitch of a vehicle ahead of the subject vehicle which is recognized by the traveling environment recognition process.

For sudden events such as pedestrians running into the road, the grace time is very short, so the degree of the front-rear deceleration is very large for avoiding the collision by braking. Accordingly, for sudden events such as pedestrians running into the road, the behavior change obtaining unit 22 obtains a specifically large deceleration in the front-rear direction.

When the subject vehicle is configured to switch the driving mode between the manual driving and the automated driving, it is preferable that the behavior change obtaining unit 22 be configured not to perform the process during the manual driving for reducing wasting process.

The notification processing unit 23 is configured to cause the notification device 10 to notify the occupant of the behavior change when the behavior change obtained by the behavior change obtaining unit 22 satisfies a condition about the behavior change (hereinafter, related to as a notification condition). Hereinafter, the behavior change obtained by the behavior change obtaining unit 22 is the magnitude of the behavior change. Accordingly, the notification condition is a threshold value for determining whether to notify based on the magnitude of the behavior change. When the behavior change obtained by the behavior change obtaining unit 22 is the difference between the behavior changes, the notification condition may be the threshold value for determining whether to notify based on the difference between the behavior changes.

The notification processing unit 23 is configured to cause the notification device 10 to notify the occupant of the behavior change when the magnitude of the behavior change obtained by the behavior change obtaining unit 22 is equal to or greater than the threshold value that is the notification condition. In contrast, the notification processing unit 23 is configured not to cause the notification device 10 to notify the occupant of the behavior change when the magnitude of the behavior change obtained by the behavior change obtaining unit 22 is less than the threshold value. According to this, the behavior change is notified or not notified based on the magnitude of the behavior change. The threshold value that is the notification condition may be set for each behavior change including the front-rear deceleration, the left-right acceleration, the up-down acceleration, and the like.

As the notification of the behavior change, the occurrence of the behavior change may be notified, or the content of the behavior change may be notified. When the occurrence of the behavior change is notified, the occurrence of the behavior change may be notified by performing the notification. When the content of the behavior change is notified, the content of the behavior change may be notified by display, audio message, or the like. When the notification device 10 includes the vibrators, the direction and the magnitude of the behavior change may be notified by switching the location and the magnitude of the vibration. When the behavior change is notified using vibration, the behavior change can be notified only to a target occupant who is necessary to know the behavior change. When the behavior change is notified using sound, the behavior change can be notified only to a target occupant by giving the directivity to the sound.

It is preferable that the notification processing unit 23 be configured to change the notification condition depending on the state of the occupant identified by the occupant state identifying unit 21. For example, it is preferable that the notification condition for each state categorized into the non-distracted group be stricter than the notification condition for each state categorized into the distracted group. "The notification condition is stricter" means that "a larger threshold value that is the notification condition is set". When the state of the occupant identified by the occupant state identifying unit 21 is the state categorized into the driving concentration group, the first threshold value is set as the notification condition. The second to fourth threshold values are used as the notification condition for the non-driving concentration states.

In the driving concentration states, the occupant is focusing on the traveling of the subject vehicle compared to the non-driving concentration state. Accordingly, the occupant is less likely to lose their posture due to the behavior change compared to the case where the occupant is in the non-driving concentration state. Accordingly, the magnitude of the behavior change that is annoying for the occupant when the behavior change is notified is larger than in the case where the occupant is in the non-driving concentration state. In view of the above, since the notification condition is stricter in the driving concentration state than in the non-driving concentration state, the increase of the number of the notification which is not necessary for the occupant can be suppressed.

The notification processing unit 23 is configured to change the notification condition depending on the state of the occupant when the state of the occupant identified by the occupant state identifying unit 21 is categorized into the non-driving concentration group. Even when the state of the occupant is categorized into the non-driving concentration state, the necessity for the notification of the behavior change of the subject vehicle may differ depending on the state. For example, when the occupant is in the state where the occupant is unlikely to be affected by the behavior change of the subject vehicle, the notification of the behavior change may be unnecessary for the occupant even when the state is categorized into the non-driving concentration group. By using different notification condition for the states of the occupant categorized into the non-driving concentration group, the increase of the notification unnecessary for the occupant can be suppressed.

For example, it is preferable that the notification condition for each state categorized into the non-holding subgroup be stricter than the notification condition for each state categorized into the holding subgroup. When the state of the occupant identified by the occupant state identifying unit 21 is the state categorized into the non-holding subgroup, the second threshold value is set as the notification condition. The third and fourth threshold values are used as the notification condition for the states categorized into the holding subgroup.

When the occupant is holding an object, the magnitude of the influence on the occupant due to the behavior change of the subject vehicle may be larger than in the case where the occupant is not holding an object. Accordingly, when the occupant is not holding an object, the magnitude of the behavior change that is annoying for the occupant when the behavior change is notified is larger than in the case where the occupant is holding an object. In view of the above, since the notification condition for the case where the occupant is holding an object than the notification condition for the case where the occupant is not holding an object, the increase of the number of the notification which is not necessary for the occupant can be suppressed.

For example, it is preferable that the notification condition for each state categorized into the solid-holding subgroup be stricter than the notification condition for each state categorized into the solid-holding subgroup. When the state of the occupant identified by the occupant state identifying unit 21 is the state categorized into the solid-holding subgroup, the third threshold value is set as the notification condition. The fourth threshold value is used as the notification condition for the states categorized into the liquid-holding subgroup.

When the occupant is holding a liquid object, the magnitude of the influence on the occupant due to the behavior change of the subject vehicle may be larger than in the case where the occupant is not holding a solid object. Accordingly, when the occupant is holding a solid object, the magnitude of the behavior change that is annoying for the occupant when the behavior change is notified is larger than in the case where the occupant is holding a liquid object. In view of the above, since the notification condition for the case where the occupant is holding a solid object than the notification condition for the case where the occupant is holding a liquid object, the increase of the number of the notification which is not necessary for the occupant can be suppressed.

It is preferable that the notification condition for a state where the occupant is less susceptible to an influence of the behavior change be stricter than the notification condition for a state where the occupant is susceptible to the effect of the behavior change. For example, even when the occupant is in the state categorized into the solid-holding subgroup, the notification condition may be different depending on the type of the solid object. For example, when the occupant is holding the mobile phone, the input operation is susceptible to the influence of the behavior change. Accordingly, the state where the occupant is holding paper medium may be less susceptible to the influence of the behavior change. Accordingly, the notification condition for the state where the occupant is holding paper medium may be stricter than the notification condition for the state where the occupant is holding the mobile phone. When the solid object held by the occupant is food that is liable to spill, the occupant is more susceptible to the behavior change than in a case where the occupant is holding food that is less likely to spill. Accordingly, the notification condition for the state where the occupant is holding food that is less likely to spill is stricter than the notification condition for the state where the occupant is holding food that is liable to spill. A loose notification condition may be set for the elderly or children who is likely to lose their posture due to the behavior change.

It is preferable that the notification processing unit 23 be configured to cause the notification device 10 to notify the occupant of the behavior change regardless of the state of the occupant identified by the occupant state identifying unit 21 when the magnitude of the behavior change obtained by the behavior change obtaining unit 22 is equal to or larger than a predetermined upper limit. The upper limit is the magnitude of the behavior change for which even the occupant in the driving concentration state needs to prepare, and can be appropriately set. The upper limit is larger than any one of the threshold values described above as the notification condition. In contrast, when the magnitude of the behavior change obtained by the behavior change obtaining unit 22 is smaller than the upper limit, it is preferable that the notification the notification processing unit 23 be configured to determine whether to notify the occupant of the behavior change based on the magnitude of the behavior change and the state of the occupant obtained by the occupant state identifying unit 21.

According to this, for the behavior change having the magnitude for which it is preferable to determine whether to notify based on the state of the occupant, the notification processing unit 23 determines whether to notify the occupant of the behavior change based on the state of the occupant. In contrast, for the behavior change having the magnitude for which it is preferable that the occupant prepares regardless of the state, the behavior change is notified regardless of the state of the occupant.

Behavior Notification Process in HCU 2

Figure 4:
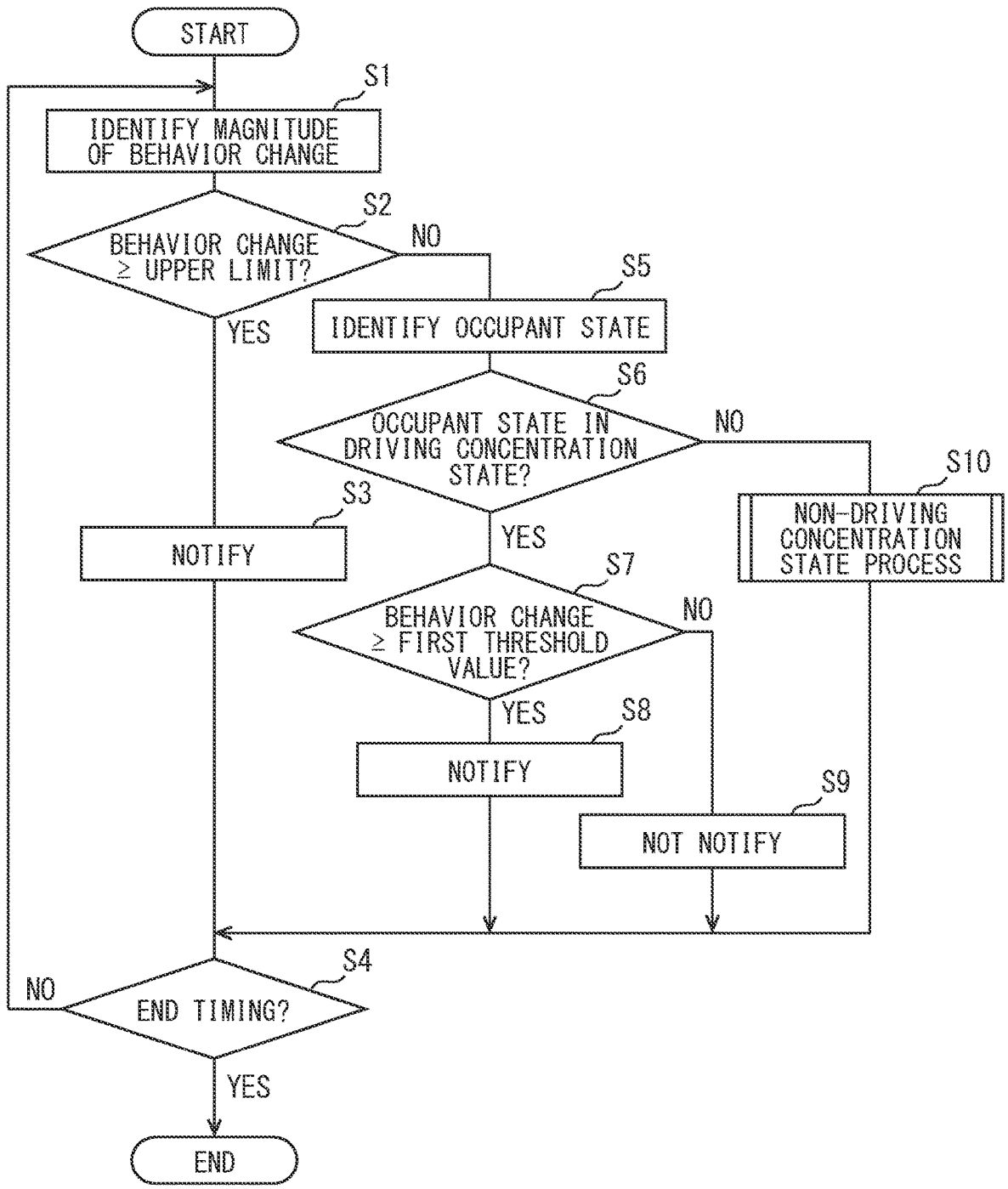
FIG. 4 is a flowchart showing an example of a behavior notification process executed by the HCU.
Figure 5:
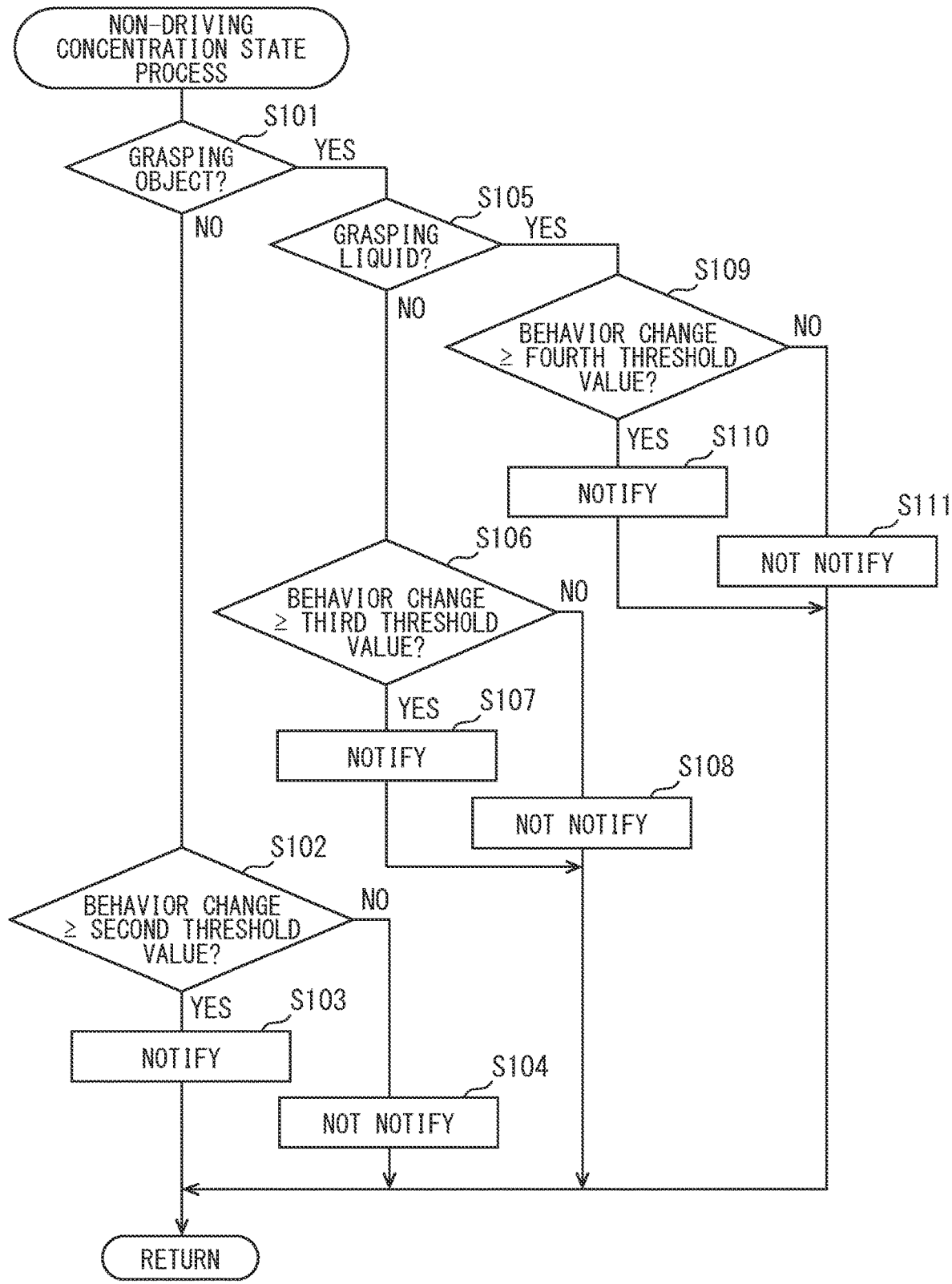
FIG. 5 is a flowchart showing an example of a non-driving concentration state process.

The following will describe an example of the behavior notification process executed by the HCU 2 with reference to flowcharts shown in FIGS. 4, 5. The process shown in FIG. 4 may be started in response to a switch (power switch) for starting an internal combustion engine or a motor generator of the subject vehicle being turned on. In addition, when the subject vehicle is configured to switch the driving mode between the manual driving and the automated driving, a setting of performing the automated driving of the subject vehicle may be added to the condition.

Figure 6:
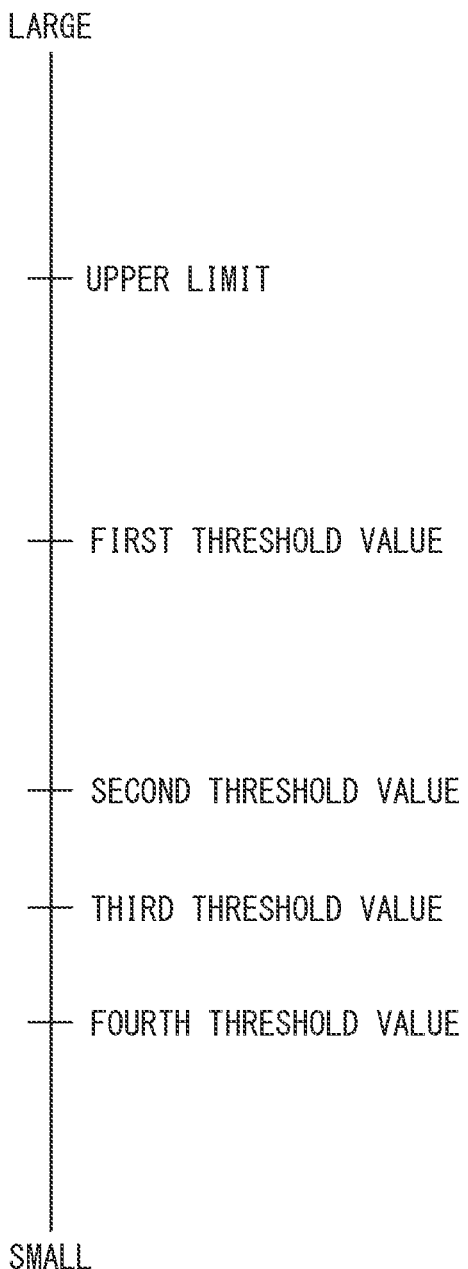
FIG. 6 is a diagram for explaining a magnitude relationship between first to fourth threshold values and an upper limit.

Further, regarding the magnitude relationship between the first to fourth threshold values and the upper limit described above, as shown in FIG. 6, the upper limit is the largest, the first threshold value is the second largest, the second threshold value is the third largest, the third threshold value is the fourth largest, and the fourth threshold value is the smallest.

First, in step S1, the behavior change obtaining unit 22 obtains the magnitude of the imminent behavior change of the subject vehicle during the automated driving. In step S2, when the magnitude of the behavior change obtained in step S1 is equal to or greater than the upper limit (S2: YES), the process proceeds to step S3. In contrast, when the magnitude of the behavior change obtained in step S1 is less than the upper limit (S2: NO), the process proceeds to step S5. When the behavior change obtaining unit 22 is configured to obtain the magnitude of multiple behavior changes including the front-rear deceleration, the left-right acceleration, the up-down acceleration and the like, each behavior change may be compared with the upper limit that is set for each behavior change. When the magnitude of at least one of the behavior changes is equal to or greater than the corresponding upper limit, it may be determined that the magnitude of the behavior change is equal to or greater than the upper limit. When the magnitude of all of the behavior changes is less than the corresponding upper limit, it may be determined that the magnitude of the behavior change is less than the upper limit.

In step S3, the notification processing unit 23 causes the notification device 10 to perform the notification about the behavior change that is determined to be equal to or larger than the upper limit in step S2. The target of the notification includes all occupants who can receive the notification by the notification device 10.

In step S4, when it is an end timing of the behavior notification process (S4: YES), the behavior notification process is terminated. In contrast, when it is not the end timing of the behavior notification process (S4: NO), the process returns to S1 to repeat the process. Examples of the end timing of the behavior notification process may include a timing when the power switch of the subject vehicle is turned off, a timing when the driving mode is switched to the manual driving, and the like.

In step S5, the occupant state identifying unit 21 identifies the state of the occupant. In step S6, when the state of the occupant identified by the occupant state identifying unit 21 is the driving concentration state (S6: YES), the process proceeds to step S7. In contrast, when the state of the occupant identified by the occupant state identifying unit 21 is the non-driving concentration state (S6: NO), the process proceeds to step S10.

In step S7, when the magnitude of the behavior change obtained in step S1 is equal to or greater than the first threshold value (S7: YES), the process proceeds to step S8. In contrast, when the magnitude of the behavior change obtained in step S1 is less than the first threshold value (S7: NO), the process proceeds to step S9. When the behavior change obtaining unit 22 is configured to obtain the magnitude of multiple behavior changes including the front-rear deceleration, the left-right acceleration, the up-down acceleration and the like, each behavior change may be compared with the threshold value that is set for each behavior change.

When the magnitude of at least one of the behavior changes is equal to or greater than the corresponding threshold value, it may be determined that the magnitude of the behavior change is equal to or greater than the threshold value. When the magnitude of all of the behavior changes is less than the corresponding threshold value, it may be determined that the magnitude of the behavior change is less than the threshold value. The same applies to the subsequent comparison with the second to fourth threshold values as notification conditions.

In step S8, the notification processing unit 23 causes the notification device 10 to notify the occupant identified as in the driving concentration state in step S5 of the behavior change whose magnitude is determined in step S7 to be equal to or greater than the first threshold value, and the process proceeds to step S4. In step S9, the notification processing unit 23 does not cause the notification device 10 to notify the occupant identified as in the driving concentration state in step S5 of the behavior change whose magnitude is determined in step S7 to be less than the first threshold value, and the process proceeds to step S4.

In step S10, non-driving concentration state process is performed, and the process proceeds to step S4. Here, an example of the flow of the non-driving concentration state process will be described with reference to the flowchart of FIG. 5.

In step S101, when the state of the occupant identified in step S5 is the state where the occupant is holding an object (S101: YES), the process proceeds to step S105. In step S101, when the state of the occupant identified in step S5 is the state where the occupant is not holding an object (S101: NO), the process proceeds to step S102.

In step S102, when the magnitude of the behavior change obtained in step S1 is equal to or greater than the second threshold value (S102: YES), the process proceeds to step S103. In contrast, when the magnitude of the behavior change obtained in step S1 is less than the second threshold value (S102: NO), the process proceeds to step S104.

In step S103, the notification processing unit 23 causes the notification device 10 to notify the occupant identified as in the state where the occupant is not holding an object in step S5 of the behavior change whose magnitude is determined in step S102 to be equal to or greater than the second threshold value, and the process proceeds to step S4. In step S104, the notification processing unit 23 does not cause the notification device 10 to notify the occupant identified as in the state where the occupant is not holding an object in step S5 of the behavior change whose magnitude is determined in step S102 to be less than the second threshold value, and the process proceeds to step S4.

In step S105, when the state of the occupant identified in step S5 is the state where the occupant is holding a liquid object (S105: YES), the process proceeds to step S109. In contrast, when the state of the occupant identified in step S5 is the state where the occupant is holding a solid object (S105: NO), the process proceeds to step S106.

In step S106, when the magnitude of the behavior change obtained in step S1 is equal to or greater than the third threshold value (S106: YES), the process proceeds to step S107. In contrast, when the magnitude of the behavior change obtained in step S1 is less than the third threshold value (S106: NO), the process proceeds to step S108.

In step S107, the notification processing unit 23 causes the notification device 10 to notify the occupant identified as in the state where the occupant is holding a sold object in step S5 of the behavior change whose magnitude is determined in step S106 to be equal to or greater than the third threshold value, and the process proceeds to step S4. In step S108, the notification processing unit 23 does not cause the notification device 10 to notify the occupant identified as in the state where the occupant is holding a sold object in step S5 of the behavior change whose magnitude is determined in step S106 to be less than the third threshold value, and the process proceeds to step S4.

In step S109, when the magnitude of the behavior change obtained in step S1 is equal to or greater than the fourth threshold value (S109: YES), the process proceeds to step S110. In contrast, when the magnitude of the behavior change obtained in step S1 is less than the fourth threshold value (S109: NO), the process proceeds to step S111.

In step S110, the notification processing unit 23 causes the notification device 10 to notify the occupant identified as in the state where the occupant is holding a liquid object in step S5 of the behavior change whose magnitude is determined in step S109 to be equal to or greater than the fourth threshold value, and the process proceeds to step S4. In step S111, the notification processing unit 23 does not cause the notification device 10 to notify the occupant identified as in the state where the occupant is holding a liquid object in step S5 of the behavior change whose magnitude is determined in step S109 to be less than the fourth threshold value, and the process proceeds to step S4.

Here, the magnitude of the imminent behavior change of the subject vehicle is compared with the notification condition, and whether or not to perform the notification of the behavior change is determined. However, the present disclosure is not limited to this. Even when the magnitude of the behavior change is not used as the imminent behavior change of the subject vehicle, the notification condition for a state where the occupant is less susceptible to an influence of the behavior change may be stricter than the notification condition for a state where the occupant is susceptible to the influence of the behavior change.

Summary of First Embodiment

For example, when the automated driving is performed such that the distance between the subject vehicle and the surrounding vehicle is kept at or above the safety distance in the front-rear direction and the left-right direction of the subject vehicle, the sudden braking and steering may increase with the increase of traffic volume because the number of vehicles entering the lane in which the subject vehicle is running increases. During automated driving, the frequency of non-driving concentration state, in which the driver and other occupants are not focusing on the traveling of the vehicle, is also expected to increase. When the sudden braking or steering occurs when the occupant is in the non-driving concentration state, the occupant may lose their posture.

According to the first embodiment, when the imminent behavior change of the vehicle during the automated driving satisfies the notification condition, the behavior change is notified, and accordingly the occupant can be notified of the imminent behavior change of the vehicle during the automated driving. Accordingly, the occupant is less likely to lose their posture by preparing for the imminent behavior change.

According to the first embodiment, even when the occupant is not focusing on the traveling of the vehicle, the notification condition is not uniformly loosen, but the notification condition is changed based on the state of the occupant. For example, even when the state of the occupant is categorized into the non-driving concentration state, the notification condition for a state where the occupant is less susceptible to an influence of the behavior change is stricter than the notification condition for a state where the occupant is susceptible to the influence of the behavior change. Accordingly, when the occupant is in a state where the occupant does not need the notification of the behavior change with a small behavior change, the notification is only notified only when the behavior change is large. As a result, the imminent behavior change can be notified to the occupant during the automated driving, and the increase of notifications unnecessary for the occupant can be suppressed when the occupant is not focusing on the traveling of the subject vehicle.

Second Embodiment

In the first embodiment, the behavior change obtaining unit 22 is configured to obtain, as the imminent behavior change of the subject vehicle during the automated driving, the behavior change required for keeping the distance between the subject vehicle and an obstacle around the subject vehicle at or above the safety distance that is calculated using the predetermined mathematical model and is the criteria for evaluating the safety level. However, the present distance is not limited to this. For example, the safety distance may be calculated without using the mathematical model. Further, the behavior change of the subject vehicle included in the traveling schedule may be obtained as the imminent behavior change during the automated driving without evaluating the safety level of the traveling schedule generated by the automated driving device 8.

Third Embodiment

In the first embodiment, the automated driving device 8 is separately provided from the HCU 2. However, the present disclosure is not limited to this. For example, an electronic control device including both functions of the automated driving device 8 and the HCU 2 may be provided. In this case, the behavior change obtaining unit 22 may be configured to obtain the imminent behavior change of the subject vehicle by generating the short-term traveling schedule as in the automated driving device 8 of the first embodiment. Further, the automated driving device 8 is separately provided from the vehicle control ECU 6. However, the present disclosure is not limited to this. For example, the automated driving device 8 may have the function of the vehicle control ECU 6. Further, the automated driving device 8 may have the function of the locator 3.

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure. In addition, the control unit and the method described in the present disclosure may be implemented by a dedicated computer that configures a processor programmed to execute one or a plurality of functions embodied by a computer program. Alternatively, the apparatus and techniques described in this disclosure may be implemented by dedicated hardware logic. Alternatively, the control unit and the control method described in the present disclosure may be implemented by one or more special purpose computers configured by a combination of a processor executing a computer program and one or more hardware logic circuits.

The computer program may be stored, as instructions to be executed by a computer, in a tangible non-transitory computer-readable medium.

What is claimed is:

1. A notification control device for a vehicle configured to perform an automated driving, the automated driving being performed by an automated driving device of the vehicle that controls driving tasks of the vehicle including steering, acceleration, deceleration, or a combination thereof, the notification control device comprising:
    an occupant state identifying unit configured to identify a state of an occupant of the vehicle among a plurality of states, the plurality of states being divided into a distracted group and a non-distracted group;
    a behavior change obtaining unit configured to obtain an imminent behavior change of the vehicle during the automated driving; and
    a notification processing unit configured to cause a notification device to notify the occupant of the imminent behavior change when the imminent behavior change obtained by the behavior change obtaining unit satisfies a notification condition, wherein
    the plurality of states include a plurality of distracted states categorized into the distracted group,
    each of the plurality of distracted states is a state of the occupant who is not focusing on traveling of the vehicle,
    the plurality of distracted states include a first distracted state and a second distracted state,
    the notification condition is set for each of the plurality of states,
    the notification condition for the first distracted state is different from the notification condition for the second distracted state,
    the notification condition for a state where the occupant is less susceptible to an influence of the imminent behavior change is stricter than the notification condition for a state where the occupant is susceptible to the influence of the imminent behavior change, wherein a stricter notification condition comprises a larger threshold value than a less strict notification condition,
    the distracted group includes at least a liquid-holding subgroup and a solid-holding subgroup,
    each state categorized into the liquid-holding subgroup is a state of the occupant who is holding a liquid object,
    each state categorized into the solid-holding subgroup is a state of the occupant who is holding a solid object,
    the notification condition for each state categorized into the solid-holding subgroup is stricter than the notification condition for each state categorized into the liquid-holding subgroup.

2. The notification control device according to claim 1, wherein
    the distracted group includes at least a holding subgroup and a non-holding subgroup,
    each state categorized into the holding subgroup is a state of the occupant who is holding an object,
    each state categorized into the non-holding subgroup is a state of the occupant who is not holding the object, and
    the notification condition for each state categorized into the non-holding subgroup is stricter than the notification condition for each state categorized into the holding subgroup.

3. The notification control device according to claim 1, wherein each state categorized into the non-distracted group is a state of the occupant who is focusing on the traveling of the vehicle, the notification processing unit is configured to cause the notification device to notify the occupant of the imminent behavior change when the state of the occupant identified by the occupant state identifying unit is categorized into the non-distracted group, and the notification condition for each state categorized into the non-distracted group is stricter than the notification condition for each state categorized into the distracted group.

4. The notification control device according to claim 1, wherein the behavior change obtaining unit is configured to obtain, as the imminent behavior change of the vehicle during the automated driving, a behavior change required to keep a distance between the vehicle and an obstacle around the vehicle at or above a safety distance, and the safety distance is a criteria for evaluating a safety level and is calculated using a predetermined mathematical model.

5. The notification control device according to claim 1, wherein the notification condition is a threshold value for determining whether to notify the occupant of the imminent behavior change based on a magnitude of the imminent behavior change, the notification processing unit is configured to notify the occupant of the imminent behavior change when the magnitude of the imminent behavior change obtained by the behavior change obtaining unit is equal to or larger than the threshold value, and the notification processing unit is configured not to notify the occupant of the imminent behavior change when the magnitude of the imminent behavior change obtained by the behavior change obtaining unit is smaller than the threshold value.

6. The notification control device according to claim 5, wherein the notification processing unit is configured to notify the occupant of the imminent behavior change regardless of the state of the occupant identified by the occupant state identifying unit when the magnitude of the imminent behavior change is equal to or larger than a predetermined upper limit, and the notification processing unit is configured to determine whether to notify the occupant of the imminent behavior change based on the magnitude of the behavior change and the notification condition corresponding to the state of the occupant identified by the occupant state identifying unit when the magnitude of the imminent behavior change is smaller than the predetermined upper limit.

7. The notification control device according to claim 5, wherein when it is predicted that a surrounding vehicle around the vehicle will enter a front of the vehicle in a lane in which the vehicle is traveling, the magnitude of the imminent behavior change obtained by the behavior change obtaining unit is larger when a distance between the vehicle and the surrounding vehicle is smaller.

8. The notification control device according to claim 1, wherein the notification device comprises a vibrator configured to apply a vibration to the occupant based on the notification condition.

9. A method of controlling a notification for a vehicle configured to perform an automated driving, the automated driving being performed by an automated driving device of the vehicle that controls driving tasks of the vehicle including steering, acceleration, deceleration, or a combination thereof, the method comprising:

identifying a state of an occupant of the vehicle among a plurality of states, the plurality of states being divided into a distracted group and a non-distracted group;

obtaining an imminent behavior change of the vehicle during the automated driving; and causing a notification device to notify the occupant of the imminent behavior change when the obtained imminent behavior change satisfies a notification condition, wherein the plurality of states include a plurality of distracted states categorized into the distracted group, each of the plurality of distracted states is a state of the occupant who is not focusing on traveling of the vehicle, the plurality of distracted states include a first distracted state and a second distracted state, the notification condition is set for each of the plurality of states, and the notification condition for the first distracted state is different from the notification condition for the second distracted state, the notification condition for a state where the occupant is less susceptible to an influence of the imminent behavior change is stricter than the notification condition for a state where the occupant is susceptible to the influence of the imminent behavior change, wherein a stricter notification condition comprises a larger threshold value a less strict notification condition, the distracted group includes at least a liquid-holding subgroup and a solid-holding subgroup, each state categorized into the liquid-holding subgroup is a state of the occupant who is holding a liquid object, each state categorized into the solid-holding subgroup is a state of the occupant who is holding a solid object, the notification condition for each state categorized into the solid-holding subgroup is stricter than the notification condition for each state categorized into the liquid-holding subgroup.

10. The method according to claim 9, wherein the notification device comprises a vibrator configured to apply a vibration to the occupant based on the notification condition.

11. A notification control device for a vehicle configured to perform an automated driving, the automated driving being performed by an automated driving device of the vehicle that controls driving tasks of the vehicle including steering, acceleration, deceleration, or a combination thereof, the notification control device comprising at least one processor and at least one memory, the at least one memory storing computer-readable instructions configured to, when executed by the at least one processor, cause the at least one processor to:

identify a state of an occupant of the vehicle among a plurality of states, the plurality of states being divided into a distracted group and a non-distracted group;

obtain an imminent behavior change of the vehicle during the automated driving; and cause a notification device to notify the occupant of the imminent behavior change when the obtained imminent behavior change satisfies a notification condition, wherein the plurality of states include a plurality of distracted states categorized into the distracted group, each of the plurality of distracted states is a state of the occupant who is not focusing on traveling of the vehicle, the plurality of distracted states include a first distracted state and a second distracted state, the notification condition is set for each of the plurality of states, and the notification condition for the first distracted state is different from the notification condition for the second distracted state, the notification condition for a state where the occupant is less susceptible to an influence of the imminent behavior change is stricter than the notification condition for a state where the occupant is susceptible to the influence of the imminent behavior change, wherein a stricter notification condition comprises a larger threshold value a less strict notification condition, the distracted group includes at least a liquid-holding subgroup and a solid-holding subgroup, each state categorized into the liquid-holding subgroup is a state of the occupant who is holding a liquid object, each state categorized into the solid-holding subgroup is a state of the occupant who is holding a solid object, the notification condition for each state categorized into the solid-holding subgroup is stricter than the notification condition for each state categorized into the liquid-holding subgroup.

12. The notification control device according to claim 11, wherein the notification device comprises a vibrator configured to apply a vibration to the occupant based on the notification condition.

* * * * *